United States Patent
Narayanan

(10) Patent No.: US 10,878,713 B2
(45) Date of Patent: Dec. 29, 2020

(54) QUANTITATIVE EDUCATION SYSTEM

(71) Applicant: Avaz Inc., Palo Alto, CA (US)

(72) Inventor: Ajit Narayanan, Chennai (IN)

( * ) Notice: Subject to any disclaimer, the term of this patent is extended or adjusted under 35 U.S.C. 154(b) by 544 days.

(21) Appl. No.: 15/663,745

(22) Filed: Jul. 29, 2017

(65) Prior Publication Data

US 2019/0035296 A1 Jan. 31, 2019

(51) Int. Cl.
*G09B 7/04* (2006.01)
*G09B 19/06* (2006.01)
*G09B 19/02* (2006.01)

(52) U.S. Cl.
CPC .............. *G09B 7/04* (2013.01); *G09B 19/025* (2013.01); *G09B 19/06* (2013.01)

(58) Field of Classification Search
None
See application file for complete search history.

*Primary Examiner* — James B Hull

(57) ABSTRACT

Systems and methods for computer-aided education include providing at least a part of a pedagogical exercise to a user to obtain a user response to the at least the part of the pedagogical exercise from the user, and also providing at least the part of the pedagogical exercise to a computer program. One or more learning elements corresponding to the at least the part of the pedagogical exercise are generated based, at least in part on the execution of the at least the part of the pedagogical exercise by the computer program. The user's abilities are analyzed with respect to the one or more learning elements based on the user response, and aspects of the learning elements such as a learned-state, not-learned state, probabilities for transition between the states, retention time, etc., are used in quantitatively education of the user.

17 Claims, 12 Drawing Sheets

| | 253 | 365<br>Task learned? | 364'<br>Missing LEs |
|---|---|---|---|
| | Task 1 | NL | 1  3  8  9 |
| | Task 2 | L | |
| | Task 3 | NL | 8 |
| | Task 4 | NL | 1  3  4  5 |
| | Task 5 | NL | 3  4  8 |
| | Task 6 | L | |
| | Task 7 | L | |
| | Task 8 | NL | 8  9 |
| | Task 9 | NL | 8 |
| | Task 1 | NL | 8  9 |

*FIG. 3E*

QUANTITATIVE EDUCATION SYSTEM

FIELD OF DISCLOSURE

Disclosed aspects are directed to quantitative learning. More specifically, exemplary aspects are directed to a computer-aided education system configured for educating a learner to perform a task, based at least in part on programming a computer to perform the task.

BACKGROUND

An objective of computer-aided education is to teach human beings the skills that a computer can be taught or programmed to perform. For instance, a computer may be programmed to perform a task or learn a skill related to playing chess, learning a language, driving a car, etc. While it may be beneficial for a human being to also possess these skills, the conventional approaches to teaching human beings these skills have not fully exploited computer-aided education in this regard.

Advances in programming and processing abilities have led to significant strides in the abilities of computers to solve problems and learn skills related to performing tasks that would be beneficial for a human being. Accordingly, it is desirable to bridge the gap between a computer's ability to learn a skill and a human being's ability to learn the same skill.

SUMMARY

Exemplary aspects of the invention are directed to systems and methods for computer-aided education, which include providing at least a part of a pedagogical exercise to a user to obtain a user response to the at least the part of the pedagogical exercise from the user, and also providing at least the part of the pedagogical exercise to a computer program. One or more learning elements corresponding to the at least the part of the pedagogical exercise are generated based, at least in part on the execution of the at least the part of the pedagogical exercise by the computer program. The user's abilities are analyzed with respect to the one or more learning elements based on the user response, and aspects of the learning elements such as a learned-state, not-learned state, probabilities for transition between the states, retention time, etc., are used in quantitatively educating the user.

For example, an exemplary aspect includes a method of quantitative education, the method comprising providing at least a part of a pedagogical exercise to a user to obtain a user response to the at least the part of the pedagogical exercise from the user and providing at least the part of the pedagogical exercise to a computer program. One or more learning elements corresponding to the at least the part of the pedagogical exercise are determined based on the execution of the at least the part of the pedagogical exercise by the computer program, and the user's abilities with respect to the one or more learning elements are analyzed based on the user response.

Another exemplary aspect includes an apparatus comprising means for providing at least a part of a pedagogical exercise to a user to obtain a user response to the at least the part of the pedagogical exercise from the user and means for providing at least the part of the pedagogical exercise to a computer program. The apparatus further comprises means for determining one or more learning elements corresponding to the at least the part of the pedagogical exercise based on the execution of the at least the part of the pedagogical exercise by the computer program, and means for analyzing the user's abilities with respect to the one or more learning elements based on the user response.

Yet another exemplary aspect includes non-transitory computer-readable storage medium comprising code, which, when executed by a computer-aided education system, causes the computer-aided education system to perform operations for quantitative education, the non-transitory computer-readable storage medium comprising code for providing at least a part of a pedagogical exercise to a user to obtain a user response to the at least the part of the pedagogical exercise from the user, code for providing at least the part of the pedagogical exercise to a computer program, code for determining one or more learning elements corresponding to the at least the part of the pedagogical exercise based on the execution of the at least the part of the pedagogical exercise by the computer program, and code for analyzing the user's abilities with respect to the one or more learning elements based on the user response.

BRIEF DESCRIPTION OF THE DRAWINGS

The accompanying drawings are presented to aid in the description of aspects of the invention and are provided solely for illustration of the aspects and not limitation thereof.

FIGS. 3A-E illustrate aspects of analyzing and improving a user's learning, based on learning elements created for a computer-aided education system, according to aspects of this disclosure.

DETAILED DESCRIPTION

Figure 1A:
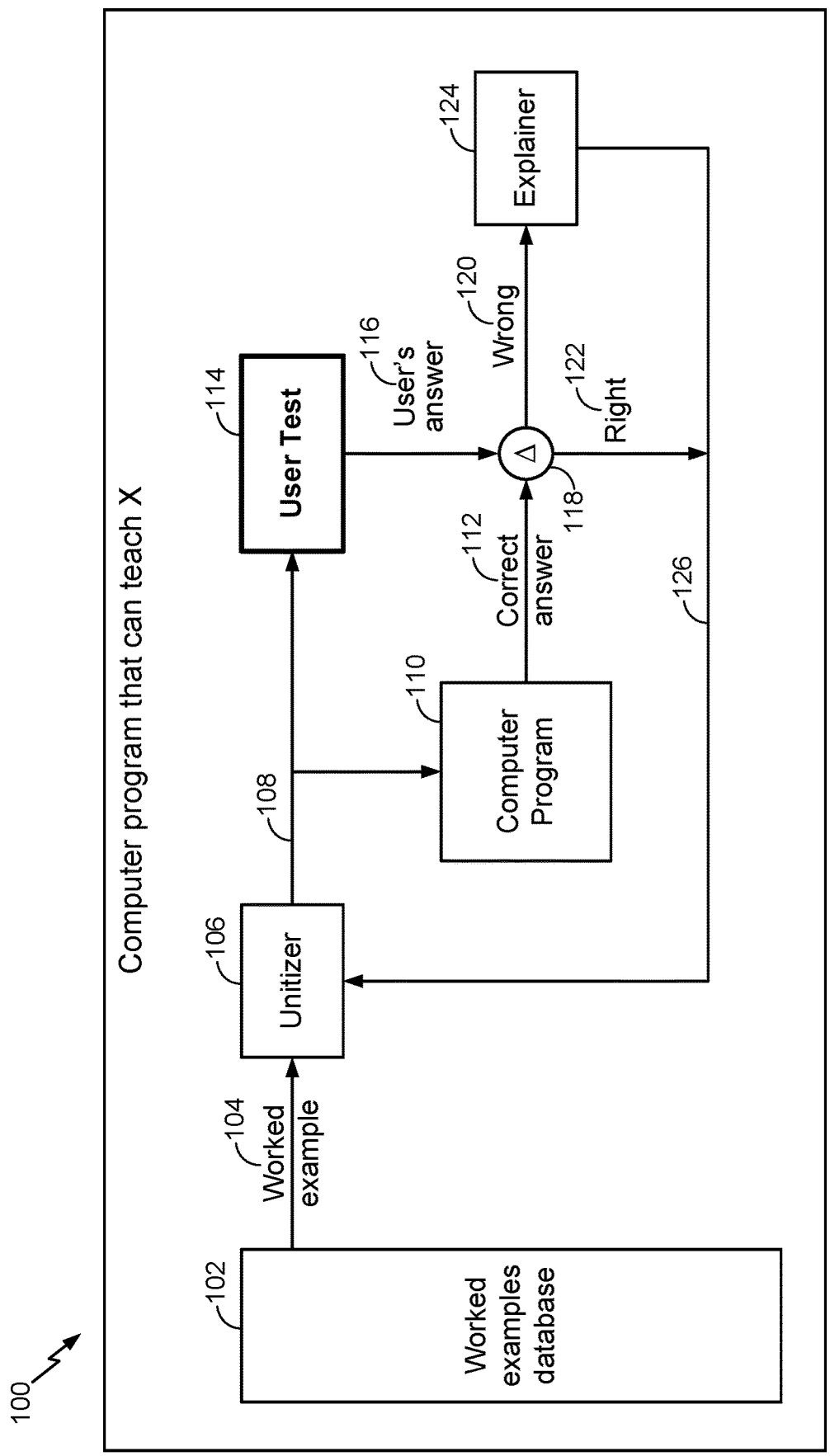
FIGS. 1A-B illustrate aspects of a computer-aided education system according to aspects of this disclosure.

Aspects of the invention are disclosed in the following description and related drawings directed to specific aspects of the invention. Alternative aspects may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any aspect described herein as "exemplary" is not necessarily to be construed as preferred or advantageous over other aspects. Likewise, the term "aspects of the invention" does not require that all aspects of the invention include the discussed feature, advantage or mode of operation.

The terminology used herein is for the purpose of describing particular aspects only and is not intended to be limiting of aspects of the invention. As used herein, the singular forms "a," "an," and "the" are intended to include the plural forms as well, unless the context clearly indicates otherwise. It will be further understood that the terms "comprises", "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Exemplary aspects of this disclosure are directed to harnessing the ability of a computer programmed to perform a task in teaching a human being to perform the task. For this, a computer (or equivalently, a computer program "P" executable by a computer) is considered, which has the ability to perform a task generally denoted as "X", wherein the task X may belong to a general task class denoted as "T". The task class T may represent a class of tasks (e.g., playing chess, driving a car, forming sentences in a foreign language, producing music on a musical instrument, etc.) that skilled human beings are able to perform in one example. The computer may be programmed to perform the task X in any manner including through a conventional program, using a neural network, using a machine learning algorithm, using a deep learning system, etc., as currently known in the art. Aspects of computer-aided education in this disclosure relate to training or imparting the skills required to perform one or more tasks in task class T, such as task X, to an unskilled human being (alternatively referred to as a "user", "learner", etc., in this disclosure). An objective of this training is to enable the unskilled human being, user, or learner to perform a sufficient number of tasks in task class T which will transform the unskilled human being into a skilled human being, at least with respect to task class T.

With reference now to FIG. 1A, a computer-aided education system is shown and designated with the reference numeral 100. Computer-aided education system 100 may configured from any processing system such as a general purpose processor or special purpose processor known in the art. The various blocks shown in computer-aided education system 100 in FIG. 1A may be implemented in hardware, software, or combinations thereof.

Computer-aided education system 100 is generally configured to teach at least a task X of task class T to a user, with an objective of teaching the user to be skilled in task class T. In one example aspect, computer-aided education system 100 utilizes pedagogical exercises to teach a user a certain skill set, such as learning a language. In general, the pedagogical exercises may include measurable elements such as pedagogical tasks (e.g., in the example of language learning, related activities involving computer applications or instruction programs which may test a user's language retention skills or for which a user's exposure may be quantitatively measured).

However, it may be difficult to measure and synchronize learning the pedagogical exercises or tasks of a class task T against a common yardstick. This is because for real-world skills (e.g., driving a car), it may be difficult to measure or enumerate the curriculum or corpus of tasks which may be captured by the selected pedagogical exercises. Furthermore, picking the correct set of pedagogical exercises for individual users based on their preexisting knowledge, for example, may also be a challenge. Yet another challenge involves determining what a user's ability with respect to an individual pedagogical exercise reveals about the user's overall learning, e.g., with respect to class task T.

In order to overcome the above challenges, a notion of "learning elements" is introduced in this disclosure, wherein the learning elements provide quantitative and measurable metrics for measuring the user's abilities with respect to the class task T, e.g., gained as a result of being exposed to or interacting with the pedagogical exercises. The learning elements may be generated based at least in part on a computer program's interaction with the pedagogical exercises. From these learning elements, the user's ability to perform a task X, e.g., to converse in the language being learned, may be estimated and used effectively in the process of teaching and improving the user's learning of the task class T.

One example of pedagogical exercises which may be used in aspects of this disclosure includes "worked examples". By way of background, among known techniques for teaching/learning that have been studied scientifically, worked examples, and more specifically, worked examples with fading, have been demonstrated to have the high effectiveness for unskilled human beings with low expertise to learn a skill. A worked example may involve teaching a user a technique to solve a specific example problem, and from thereon, teaching the user to extrapolate the technique to solving similar problems (e.g., in the case of trigonometry, teaching the user to solve an equation for a specific set of angles with the objective of imparting the ability to the user to solve similar equations for different sets of angles).

In the example illustration of computer-aided education system 100 shown in FIG. 1, computer-aided education system 100 is shown to include pedagogical exercises in worked examples database 102, wherein worked examples database 102 comprises a set of pedagogical tasks of class task T, wherein each of these pedagogical tasks is referred to as a worked example. In various other examples which will be described in the following sections, different types of pedagogical exercises will be considered, and so it will be understood at this juncture that worked examples are only illustrative and not meant to be a limitation of pedagogical exercises.

From worked examples database 102, a specific pedagogical task is shown as worked example 104. In each phase or cycle of computer-aided education implemented by computer-aided education system 100, at least a part of a pedagogical exercise is provided to the user, for example, by decomposing worked example 104 into component steps. In the illustration of FIG. 1A, worked example 104 is provided as an input to unitizer 106, wherein unitizer 106 is configured to break down worked example 104 into component unitary steps 108. The component unitary steps 108 may relate to the steps of decision making or problem solving that a user must do in order to solve worked example 104 (it is noted that the concepts of unitary steps will be discussed in more detail in the following sections). In one aspect, each one of unitary steps 108 is presented to the user for interaction (or in one example, testing) in the block designated as user test 114 in the context of a multistep interactive test that may simulate worked example 104.

Each one of unitary steps 108 is also presented to a computer or computer program 110 that is configured to perform tasks of class task T, or in this case, configured to correctly solve worked examples of worked examples database 102 and provide correct answer 112. In accordance with techniques which will be covered in greater detail in the following sections, the learning elements for class task T may be generated based on the performance of unitary steps 108 by computer program 110. It is noted at this juncture that each unitary step 108 may correspond to one or more learning elements.

The user's answer 116, output from user test 114, is then compared with correct answer 112 in comparison block 118. If the user provided a wrong answer, i.e., user test 114 does not match correct answer 112, then a signal or indication such as wrong 120 may trigger explainer block 124 to provide instruction to the user (e.g., showing or displaying the correct answer for that unitary step 108 on a computer screen). Subsequently, from either explainer block 124 or if user's answer 116 was correct then from the indication or signal right 122, trigger 126 may be enabled to prompt unitizer 106 to supply the next unitary step 108. The above process may continue for each worked example 104 or for each cycle or phase of computer-aided education. Based on the user's answers 116 for each unitary step 108, the user's abilities may be correlated to which learning elements were learned and which learning elements were not-learned. This analysis based on the user's state of learning (learned/not-learned) of the learning elements enables computer-aided education system 100 to effectively teach the tasks of task class T to the user.

Figure 1B:
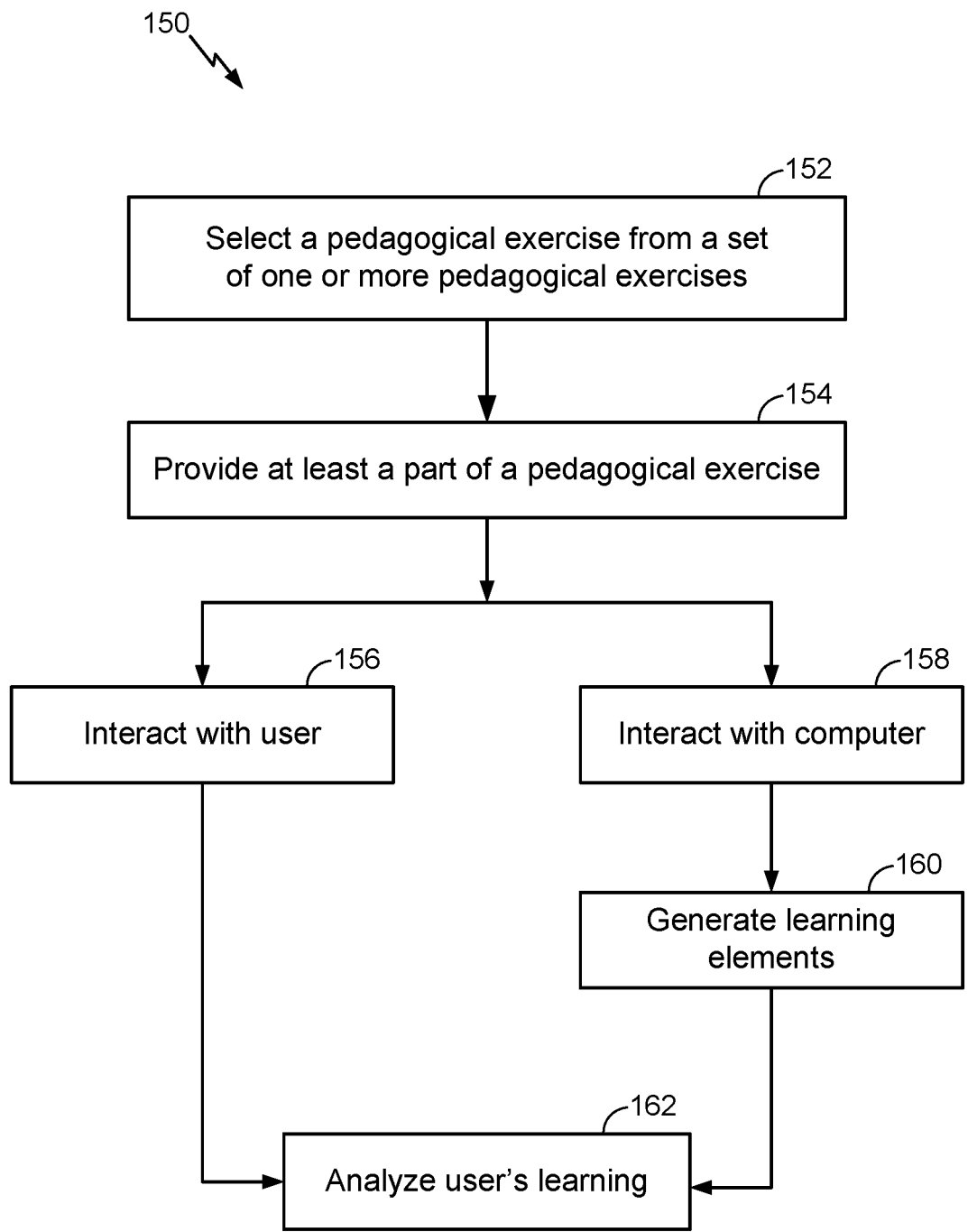

It will be appreciated that the exemplary aspects of this disclosure include various methods and/or means for performing the above-described processes, functions and/or algorithms. FIG. 1B illustrates a flow-chart pertaining to an example process 150 performed by computer-aided education system 100 of FIG. 1A.

In Block 152, a pedagogical exercise may be selected from a set of one or more pedagogical exercises (e.g., worked example 104 may be selected from worked example database 102). Block 154 includes providing at least a part of a pedagogical exercise (e.g., a pedagogical tasks such as worked example 104 of worked examples database 102, which may be decomposed, e.g., unitized in unitizer 106) to the user, for interaction with the user in Block 156. Block 158 comprises providing at least the part of the pedagogical exercise to a computer program (e.g., for interaction with computer program 110). Block 160 comprises determining one or more learning elements corresponding to the at least the part of the pedagogical exercise based on the execution of the at least the part of the pedagogical exercise by the computer program (e.g., learning elements are generated by computer-aided education system 100, based at least on the interaction of at least the part of the pedagogical exercises with the computer in Block 158 in aspects which will be explained in further detail in the following sections). Block 162 comprises analyzing the user's abilities with respect to the one or more learning elements based on the user response (e.g., the user's learning is analyzed with respect to the user's learning of the learning elements, based on the outcome of the interaction of at least the part of the pedagogical exercises with the user in Block 156).

Figure 2A:
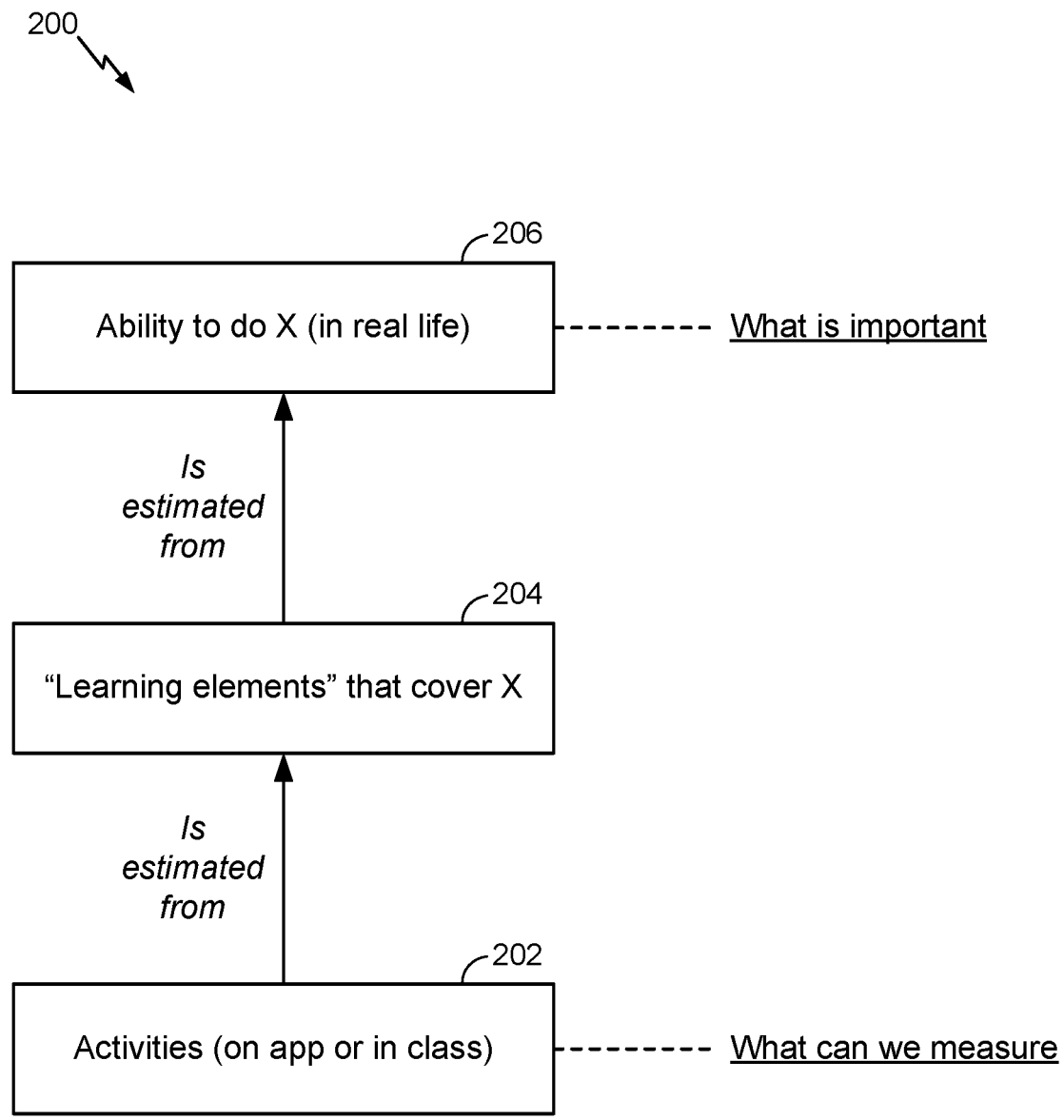
FIGS. 2A-E illustrate aspects of determining learning elements for a computer-aided education system, according to aspects of this disclosure.

With reference now to FIG. 2A, an overview of a quantitative computer-aided education system design 200 according to this disclosure is shown (e.g., implemented by computer-aided education system 100). An objective of design 200 is to provide a means for teaching a user the skills related to tasks of a class task T. Block 202 represents a set of tasks of task class T (e.g., worked examples database 102).

Block 204 represents an exemplary set of learning elements which may be estimated from Block 202, including learning elements that cover an example task X. One aspect of this disclosure is directed to estimating the learning elements in Block 204 that may be used to teach a learner a specific task X. In this regard, an exemplary canonical set of learning elements may be created, e.g., using a computer program such as computer program 110 or other means for estimating these learning elements of Block 204 from Block 202, for example. In design 200, the means for estimating the learning elements may include any means for mapping all learning, teaching and testing actions in Block 202 to Block 204.

Block 206 represents the learner's ability with respect to class task T or more specifically for individual tasks X which may be estimated from the user's abilities with respect to the learning elements in Block 204 which cover the task X. Exemplary aspects of design 200 may also include means for mapping a specific state of a student's learning elements in Block 204 into a single real-world competence measure in Block 206. In further aspects, design 200 may also include means for evaluating and implementing curricula using the information in Block 206.

Aspects of estimating Block 204 from Block 202 of design 200 will be explained in further detail with reference to FIGS. 2B-E in the following sections.

Figure 2B:
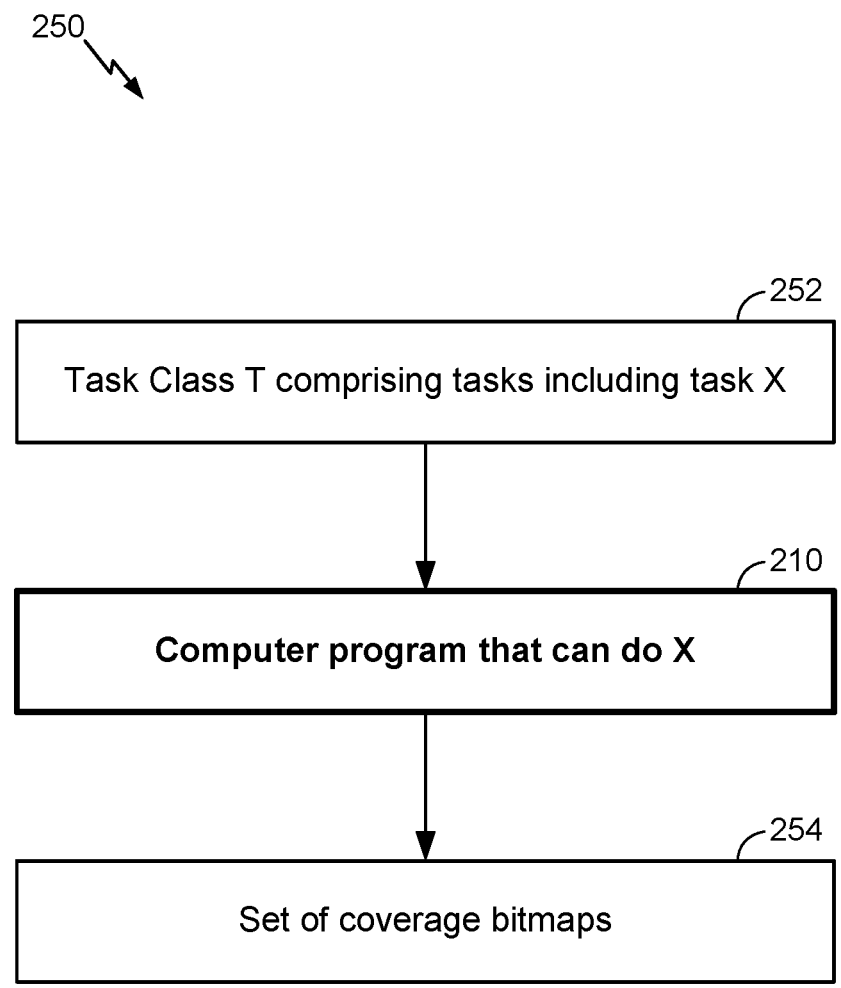

Referring now to FIG. 2B, design 250 illustrates one example aspect of estimating Block 204 from Block 202 in design 200 of FIG. 2A. In design 250, Block 252 is one example of Block 202 of design 200. A task class T comprising tasks which may include task X is shown in Block 252. A computer program such as computer program 110 of FIG. 1 is shown in Block 210. Computer program 210 may be configured to interact with or execute tasks of Block 252. A meta-analysis or coverage analysis is performed on the execution of tasks in Block 252 by computer program 210 (e.g., by another program of computer-aided education system 100) to generate a set of coverage bitmaps shown in Block 254. The coverage bitmaps may be an example means for estimating learning elements in Block 204 of design 200.

To explain coverage bitmaps further, the execution of tasks by computer program 210 is considered. For a particular input which is processed by computer program 210 in the course of execution of the tasks, it is possible to find out which lines of code were executed (and how many times, and in what order, etc.), which is referred to as coverage analysis. In an exemplary aspect of this disclosure, coverage analysis may be performed on computer program 210 configured to perform a task X. For example, referring back to FIG. 1A, if computer program 110 executes a unitary step 108, a coverage analysis is performed (e.g., by a program implemented in computer-aided education system 100), on the lines of codes which were executed by computer program 110 in executing the unitary step 108.

Figure 2C:
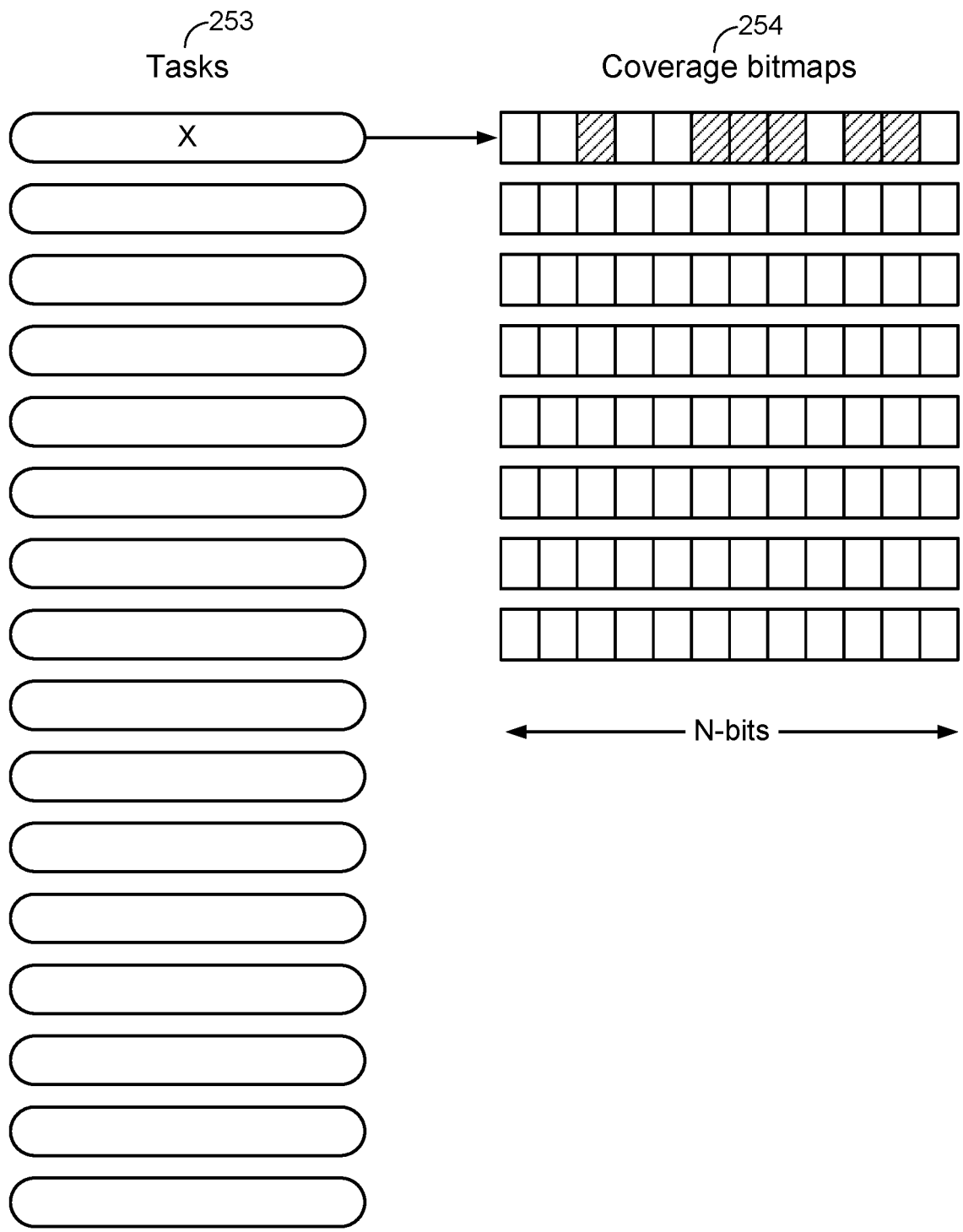

FIG. 2C provides an example illustration of the above-described mapping the tasks in Block 252 to coverage bitmaps in Block 254. As an overview, FIG. 2C generally illustrates mapping lines of computer program 210 to a vector (e.g., an N-bit vector), and determining a coverage bitmap for the at least the part of the pedagogical exercise discussed above (e.g., a pedagogical task) by mapping the lines of the computer program that are triggered in the execution of the at least the part of the pedagogical exercise by computer program 210 to one or more bits of the vector. The one or more learning elements corresponding to the at least the part of the pedagogical exercise may then be determined, at least in part, from the coverage bitmap.

In more detail, computer program 210 may be assumed to have one or more, say a number N, lines of code. Correspondingly, an N-bit vector or bitmap is created with N-bits, with each bit corresponding to a line of code (keeping in mind that in alternative aspects, more information-rich coverage representations may be used, e.g., with multiple bits or bit-vectors corresponding to each line of code). The N-bit bitmap is referred to as the coverage bitmap. It will be understood that coverage may be measured in other ways which are within the scope of this disclosure. For example, for machine-language based programs or neural network implementations, the activation patterns of the neurons in neural networks may be used to provide similar coverage analyses as the coverage information based on lines of codes discussed more exhaustively herein.

With combined reference to FIGS. 2B-C, when computer program 210 is executed to perform tasks 253 of task class T, such as the task X, the set of lines of codes which were triggered, and the lines of code which were not triggered are monitored (e.g., using code coverage tools which are known or available in existing programming language platforms). In an implementation, the lines of code which were triggered may have corresponding bits in the coverage bitmap for task X set to "1", while the bits for the lines of code which were not executed for task X may be set to "0" (a value of "1" for a bit of the coverage bitmap corresponding to task X in FIG. 2C is representatively shown with shading and a value of "0" is representatively shown without shading). The coverage bitmap for task X derived in this manner provides a mapping in Block 254 of the portions of computer program 210 which were used or triggered in the execution of the task X. Stated differently, Block 254 includes a set of such coverage bit maps which may be created based on the lines of code which were triggered by computer program 210 for executing various tasks such as task X in Block 252. It is noted that there may be two or more tasks in Block 252 which may result in the same coverage bitmap being created, so the number of coverage bitmaps in Block 254 may be less (in some cases, significantly less) than the number of tasks in Block 252. A possible many-to-one relationship between the number of tasks in Block 252 and the number of coverage bitmaps in Block 254 is representatively shown in FIG. 2C, with more number of tasks shown than the number of coverage bitmaps illustrated.

While the above-described aspects of generating coverage bitmaps provide at least one example means for quantifying or estimating the learning elements in Block 204 from Block 202 of FIG. 2A, the information supplied by the coverage bitmaps may not be sufficient or useful in some aspects, because the task X may not be performed by either the human learner or the computer program in a single step.

Figure 2D:
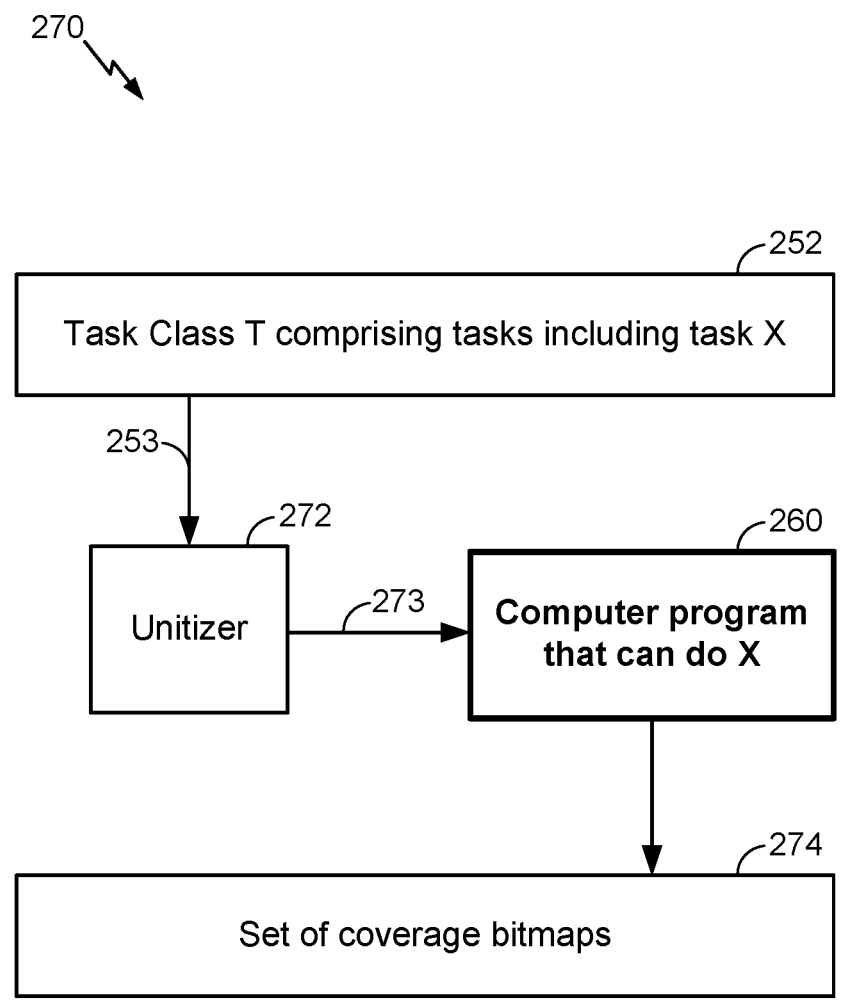

Therefore, referring to FIG. 2D, alternative design 270 is shown, wherein at least the part of pedagogical exercise discussed above may be generated by decomposing a pedagogical task of the pedagogical exercise into one or more unitary steps. For example, tasks 253 may be decomposed into one or more intermediary unitary steps 273 by unitizer 272. For the sake of illustration, the following example scenarios are presented for decomposing tasks 253 into the set of unitary steps 273 by unitizer 272: in the case of tasks related to a chess game, the unitary step 273 may be a particular move, wherein a player, by executing the move, may take the state of the chessboard from one configuration to another; in the case of tasks related to driving a car, a unitary step 273 may be each decision point taken by the driver; and in the case of tasks related to forming a sentence in a language, unitary steps 273 may include the addition of individual words, terms, phrases, tenses, etc., to stepwise build up the sentence. Various other examples of decomposing tasks 253 into such unitary steps 273 will be understood by one skilled in the art, aided by this disclosure, without departing from the scope of this invention.

Accordingly, tasks 253 in Block 252 of FIG. 2D may be decomposed into component unitary steps 273 by unitizer 272 and a coverage bitmap, referred to herein as a "delta bitmap" is generated, wherein the delta bitmap is a coverage bitmap for a unitary step 273 executed by computer program 210. It is noted that computer program 210 may not perform task X using the same unitary steps that a human learner may use in performing task X. However, the representative delta bitmaps created by feeding the unitary steps 273 to computer program 210 provide useful information, as will be explained in the following sections. The set of delta bitmaps generated in this manner are provided in Block 274.

Figure 2E:
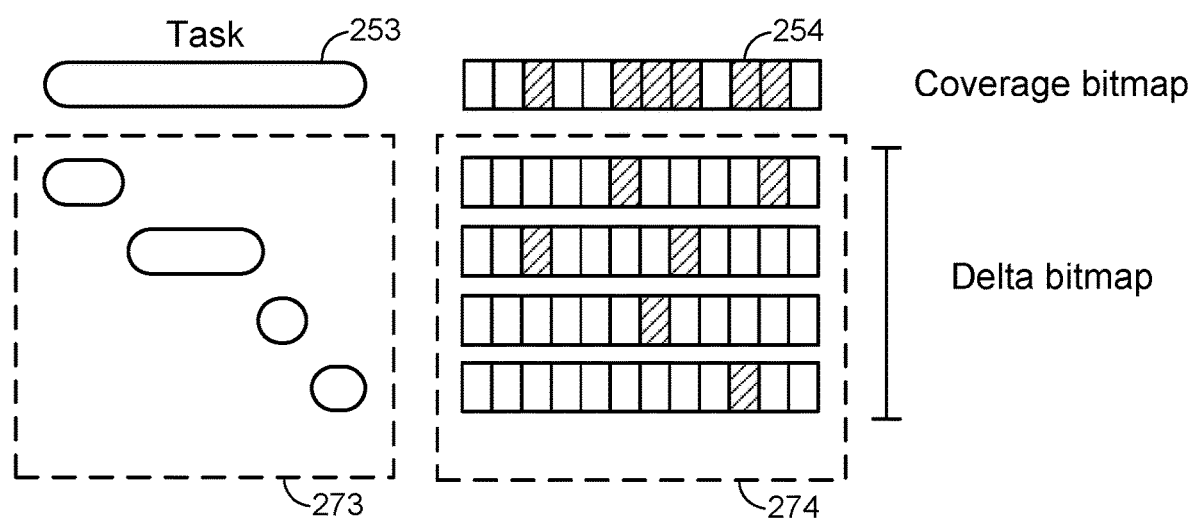

The above description of converting tasks into delta bitmaps is representatively shown in FIG. 2E. As an overview, FIG. 2E illustrates aspects of mapping lines of the computer program to a plurality of vectors which are referred to in this section as delta vectors, with each delta vector corresponding a unitary step. One or more delta bitmaps corresponding to the one or more unitary steps are determined, wherein a delta bitmap for a unitary step comprises a mapping of the lines of the computer program that are triggered in the execution of the unitary step by the computer program to one or more bits of a corresponding delta vector. The one or more learning elements corresponding to the at least the part of the pedagogical exercise may then be determined from the one or more delta bitmaps.

More specifically, FIG. 2E (with combined reference to FIGS. 2B-E) shows tasks 253 in Block 252 may be mapped to coverage bitmaps in Block 254. Each task 253 is representatively shown to include unitary steps 273, having been decomposed by unitizer 272. Delta bitmaps 274 are shown for corresponding unitary steps 273 by mapping lines of computer program 210 which were triggered in the execution of the respective unitary step to bits of a corresponding bitmap. Exemplary aspects of creating these delta bitmaps 274 will now be explained further.

The coverage bitmaps in Block 254 may be viewed as representing a set of code-points (or the lines of codes set to "1" upon execution of the task) that were used in the end-to-end execution of a task. Now, considering the set of tasks 253 in task class T of Block 252 (e.g., a dataset of tasks t1, t2, . . . , tn), each of these tasks 253 may similarly be decomposed into unitary steps 273. The following example notation for unitary steps 273 may be used: in the case of the task t1, "k" unitary steps of task t1 may be denoted as u1_1, u1_2, . . . u1_k. Similarly the other tasks t2-tn may comprise respective one or more unitary steps when decomposed similarly. With this notation, the delta bitmap for a unitary step u1_k of task t1 may be generated in the following manner. If the coverage bitmap for computer program 210 from initiation till the completion of unitary step u1_(k−1) is denoted as B1 and the coverage bitmap from initiation till the completion of the step u1_k is B2, then the delta bitmap for the unitary step u1_k may be generated as a bitmap in which a bit is 1 if the corresponding bit in coverage bitmap B1 is 0, and the corresponding bit in coverage bitmap B2 is 1; and 0 otherwise. In other words, the delta bitmap for unitary step u1_k represents the set of incremental steps that are executed when computing the coverage bitmap for unitary step u1_k. Proceeding in this manner, the set of all delta bitmaps for each unitary step of all tasks in the dataset (e.g., in Block 252) are calculated and provided in Block 274, for example. The number of unique delta bitmaps may be smaller (in some cases, significantly smaller) than the total number of unitary steps, since multiple tasks may share the same unitary steps and multiple unitary steps may share the same delta bitmap.

As mentioned previously, the delta bitmaps generated in Block 274 may serve as useful learning elements (e.g., estimated from Block 202 in Block 204 of FIG. 2A) because they may model certain patterns of activities that constitute a unitary step, e.g., based on a simulation provided by computer program 210. Using the delta bitmaps, it is possible to map, for example, worked examples 104 in worked examples database 102 of FIG. 1A, to delta bitmaps which are activated by each worked example 104 when unitary steps 108 are executed in computer program 110.

Further, it is also possible to estimate Block 206 from Block 204 of FIG. 2A using the delta bitmaps in one example. For example, using delta bitmaps, test results (e.g., right 122 or wrong 118 in FIG. 1A) may be mapped to a model of the user's proficiency based on delta bitmaps, with a right or wrong answer affecting the proficiency score for the corresponding bitmaps positively or negatively, respectively. Further, from the delta bitmaps that the user knows, it may be possible to map a lesson plan to the delta bitmaps (e.g., a lesson may be calculated in terms of which set of delta bitmaps the user knows) to determine which lesson may add the most value to the user's learning of the tasks of the class task T. An ability metric may also be generated using the delta bitmaps a user knows, to calculate the percentage or proportion of tasks of the class task T the user may be able to know or successfully perform.

In FIG. 2E, it will be recognized that unitary tasks 273, and therefore delta bitmaps 274 corresponding to unitary tasks 273 may not be independent of each other, and proficiency in one task can also mean a certain level of proficiency in another task. Stated differently, if a user's learning with respect to one unitary step 108 (e.g., based on user's answer 116 of FIG. 1A) reveals that the user knows learning elements corresponding to one set of delta bitmaps, depending on the task class, the ability of the user with respect to that unitary step 108 may also indicate that the user knows other learning elements related to these delta bitmaps. For example, a user who knows how to make a U-turn while driving a car may also know how to make a left turn while driving a car, even though making a U-turn and making a left turn may correspond to different delta bitmaps in a particular implementation of a driving algorithm on computer program 110, for example. Therefore, it is useful to express delta bitmaps in terms of combinations of a smaller set of vectors, so that the above-noted dependencies can be captured accurately and exploited in the computer-aided education according to exemplary aspects.

Accordingly, in an exemplary aspect, implementation-independent and orthogonal bitmaps may be generated from the above-described delta bitmaps. In one aspect, an algorithm referred to as principal component analysis may be used in this regard. By way of background, variations of principal component analysis have been used in other fields of technology, for extracting information content (usually, a large quantity of information) to generate an implementation-independent representation. For instance, in the field of face recognition, starting from a very large databases of face images, principal component analysis may be used to extract a relatively small set of face image representations known as "eigenfaces" (e.g., in the order of 150 eigenfaces). Using these eigenfaces, any face image may be expressed as a combination of the set of eigenfaces. For example, a coefficient or weight may be associated with each one of the set of eigenfaces and any face image may be expressed as a vector or sum of the set of eigenfaces weighted by their respective coefficients. The number of eigenfaces required to represent any large number of face images is observed to be about the same (e.g., 150) regardless of the number of face images used. Thus, the eigenfaces may encapsulate facial information in an implementation-independent manner, wherein the eigenfaces are also orthogonal to each other.

In aspects of this disclosure, an exemplary implementation of principal component analysis (or more generally, any dimensionality reduction algorithm or algorithm to identify latent variables) may be used to extract from a possibly large set of delta bitmaps, an smaller set of vectors, referred to herein as "canonical delta vectors", or alternatively, as "c-delta vectors". In an example implementation of the principal component analysis, the number of c-delta vectors used to encapsulate information related to the large set of delta bitmaps (e.g., in Block 274 of FIG. 2D) may be relatively small. Various other alternative algorithms for unsupervised learning may also be used rather than the principal component analysis to generate the c-delta vectors, without departing from the scope of this disclosure. In exemplary aspects, these c-delta vectors may form independent learning elements (e.g., in Block 204 of FIG. 2A) for the task X. Any agent (either a human user or a computer program) that can do the task X, can have their ability to perform the tasks including task X characterized by these c-delta vectors. Further features and characteristics of the exemplary c-delta vectors and their use in computer-aided education will now be provided.

In general, exemplary aspects include further comprising performing a dimensionality reduction on one or more sets of delta bitmaps corresponding to one or more learning elements, to generate a set of one or more c-delta vectors, wherein the one or more c-delta vectors may be orthogonal, and represent the one or more learning elements, such that each of the one or more delta bitmaps is expressed as a combination of one or more learning elements.

In one implementation, c-delta vectors may be generated in the following manner. In Block 274 of FIG. 2D, for example, the number of unique delta bitmaps present therein may be assumed to be the number "Nu". This leads to an assumption that the corresponding Nu delta bitmaps denoted as "B1" to "BNu" represent a quantitative set of computational tasks that need to be learned by the learner in order to mimic the capabilities of computer program 210 with respect to the tasks in class task T of Block 252. However, as noted above, the delta bitmaps in Block 274 may not be independent: there may be delta-bitmaps with only minor variations between one another; there may be delta bitmaps that are linear combinations of other ones, etc. The delta bitmaps in Block 274 may also be implementation-dependent, e.g., on computer program 210. The implementation-independent c-delta vectors may be generated such that any of the delta bitmaps B1 to BNu may be expressed as a combination of c-delta vectors, and more specifically in one example, a linear combination of one or more c-delta vectors. In one aspect, the c-delta vectors may be defined as the smallest such set of linearly independent vectors, which allows the c-delta vectors to be viewed as representative of the learnable elements of computer program 210.

In one aspect, c-delta vectors may be created from delta bitmaps B1 to BNu by calculating a singular value decomposition of a matrix B formed by stacking the vectors "b" corresponding to each unique delta bitmap. The singular vectors so obtained are the c-delta vectors.

The c-delta vectors may be used to represent the learning elements of Block 204 in exemplary aspects, rather than the delta bitmaps or the coverage bitmap's individual bits, because the process of calculating the c-delta vectors ensures that the c-delta vectors are maximally independent of each other. However, it is noted that the c-delta vectors do not directly correspond to a set of unitary steps, and therefore may not be directly communicable to the user. On the other hand, any set of steps that can be communicated to the user, can be represented by a set of c-delta vectors, which provides the capability for expressing any learning of the user in terms of a standardized set of measures, i.e., in terms of a set of c-delta vectors. Accordingly, the c-delta vectors comprising learning elements in Block 204 of FIG. 2A allow for means for estimating Block 206 from Block 204 according to techniques which will now be described in greater detail.

Referring back to computer-aided education system 100 of FIG. 1A, the c-delta vectors are useful in quantifying what exactly is learned, tested or taught at a particular unitary step 108. Accordingly, dimensionality reduction on one or more sets of delta bitmaps corresponding to one or more learning elements, may generate a set of one or more c-delta vectors, wherein the one or more c-delta vectors are orthogonal and represent the one or more learning elements, such that each of the one or more delta bitmaps is expressed as a combination of one or more c-delta vectors. For instance, with combined reference to FIG. 1A and FIG. 2D, the delta bitmap associated with a particular unitary step 273 is determined, as previously described. The set of delta bitmaps generated for the various unitary steps, in Block 274, may then be expressed in terms of the set of c-delta vectors, e.g., a linear combination of c-delta vectors, as will be discussed in more detail below.

Figure 3A:
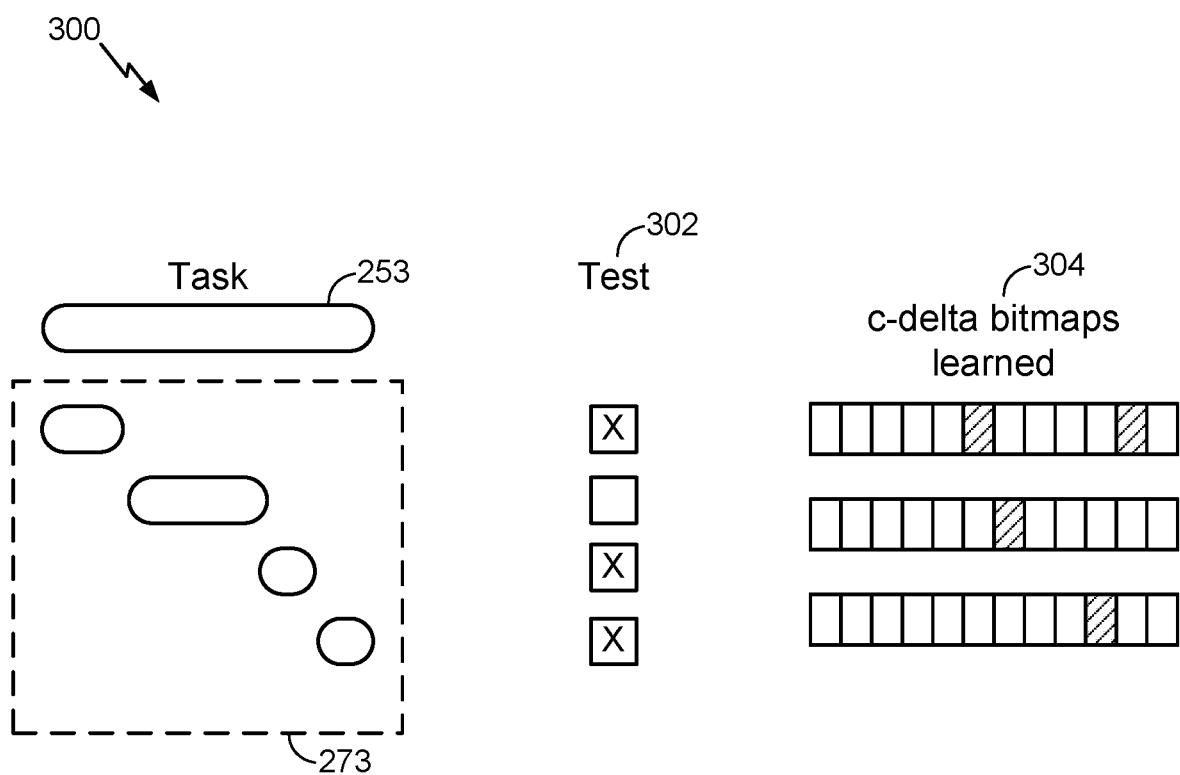

With reference now to FIG. 3A, an exemplary design 300 for computer-aided education system is shown, which may be useful in estimating Block 206 from Block 204 of FIG. 2A. The user's abilities with respect to the one or more learning elements may be analyzed based on the user response, e.g., by mapping the one or more unitary steps to the one or more learning elements. Referring back to FIGS. 1A and 2D, each unitary step 108 or 273 is tested (e.g., in a similar block as user test 114 of FIG. 1A). Depending on whether the user's answer is correct (e.g., right 122) or incorrect (e.g., wrong 120), test vector 302 is created with these indications of right or wrong for each unitary step. Since the unitary steps 273 map to c-delta vectors as noted above, based on test vector 302, the c-delta vectors which have been learned by the user (e.g., corresponding to unitary steps for which the user provided a correct answer) and those which have not been learned or have been learned and subsequently forgotten (e.g., corresponding to unitary steps for which the user provided an incorrect answer) can be generated, generally designated by the reference numeral 304.

Figure 3B:
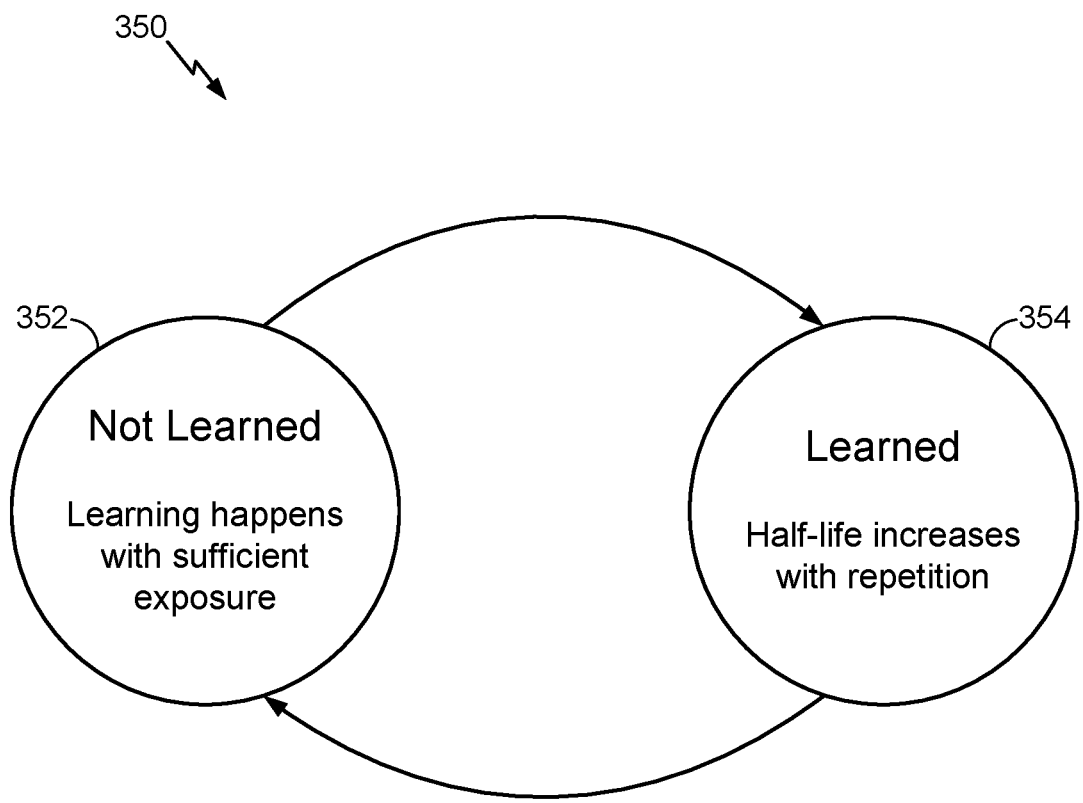

Referring now to FIG. 3B, learning model 350 created based on the above-described c-delta vectors used as learning elements, is illustrated. Learning model 350 may be created for each of the learning elements, to measure the user's capability in each learning element. For each unitary step, it is determined whether the one or more learning elements mapped to the unitary step are in a learned state or a not-learned state. In more detail, each learning element is represented by a state which is one of not-learned (NL) state 352 and learned (L) state 354.

Certain activities, tracked by the computer-aided education system 100, for example, may cause a learning element to be learned by the user, thus transitioning from not-learned state 352 to learned state 354. For each learning element, the probability associated with transitioning between the learned state and the not-learned state, or vice-versa is determined. For a learning element in a learned state, the half-life of retention in the learned state or a time to transition to the not-learned state is also determined. In one instance, a predictor is configured to use statistical inference based on a large number of data points to determine when this transition from not-learned state 352 to learned state 354 occurs. Once a user is in learned state 354 for a particular learning element, further activities, also tracked by computer-aided education system 100, may maintain the level of remembrance of this learning element. In one instance, a predictor may use statistical inference to determine the expected time at which the probability that the user remembers the learning element drops to less than 50%. This expected time duration is called the half-life of the learning element. At the end of the half-life period, if the user has not been exposed to activities that maintain the learning state for that element at learned state 354, the learning element transitions from learned state 354 to not-learned 352, indicating that the user has forgotten the learning element. Thus, the user goes from not-learned state 352 to learned state 354 when a learning element is learned and the reverse from learned state 354 to not-learned state 352 when the learning element is forgotten. Based on the above-described predictions of a learner's capability of learning, predictions may be made as to when the flip from not-learned state 352 to learned state 354 may occur, as well as predictions of increases in the half-life or retention.

Figure 3C:
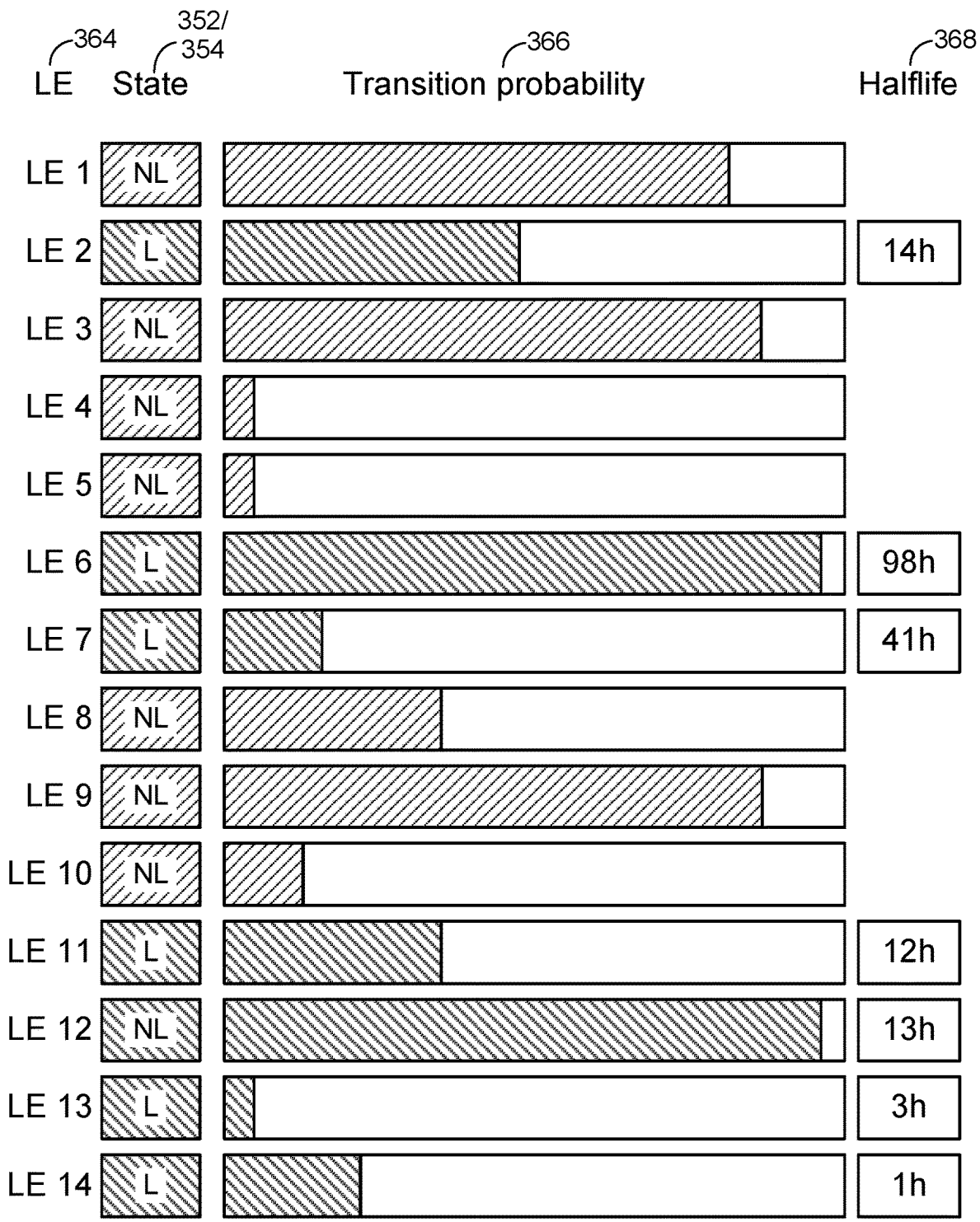

FIG. 3C illustrates an example of utilizing learning model 350 in estimating Block 206 from Block 204 of FIG. 2A. In FIG. 3C, a set of 14 learning elements 364 identified as learning elements 1-14 (e.g., c-delta vectors 304) that may be generated or provided in Block 204 are shown. Corresponding not-learned state 352 and learned state 354 associated with each one of learning elements 364 is illustrated. Transition probability 366 for each learning element's transition may be obtained using a predictor described above. Corresponding half-life 368 for each learning element in a corresponding learned state 354 is also illustrated.

Figure 3D:
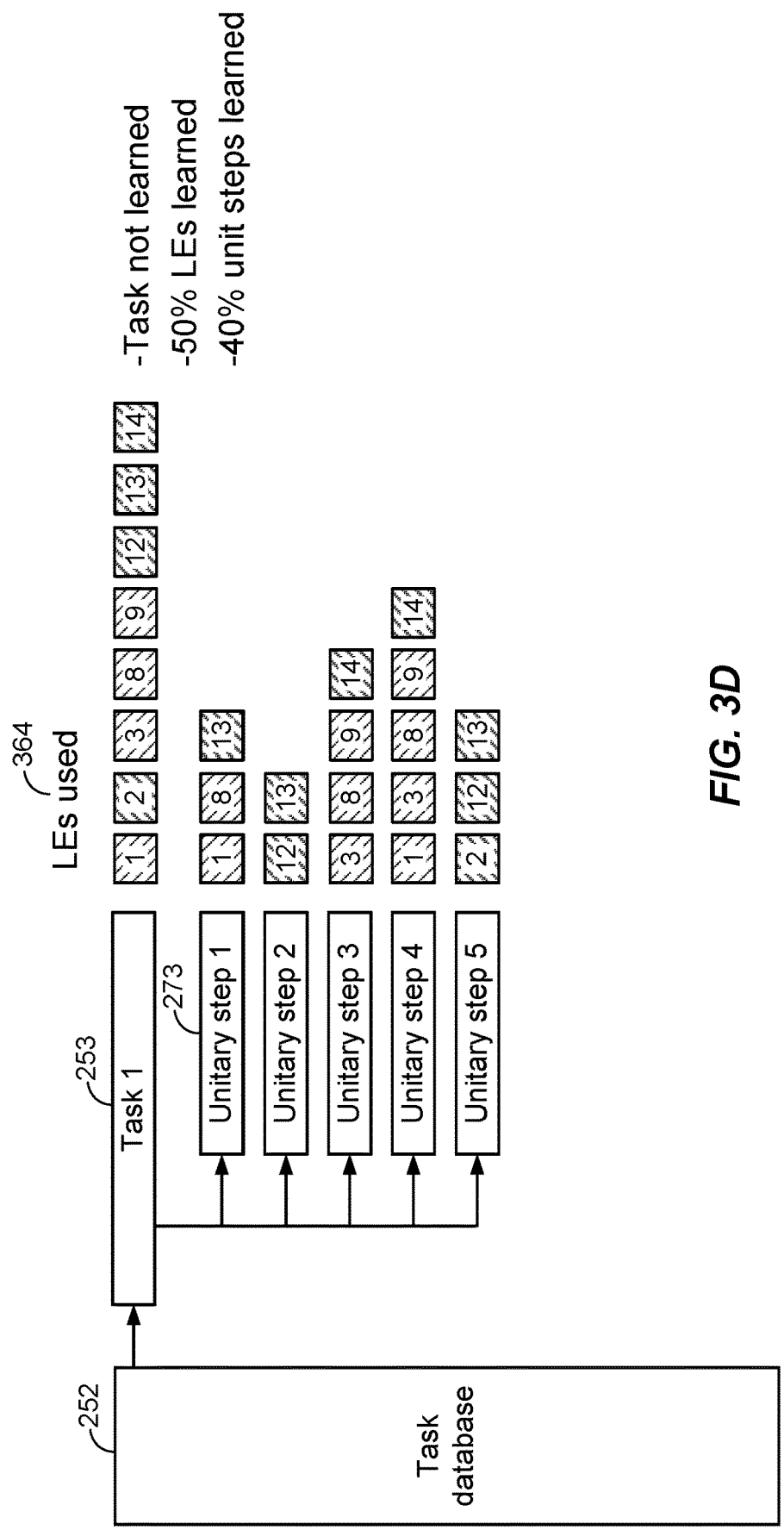

In exemplary aspects, for each pedagogical task, the corresponding learning elements in the learned state and the learning elements in the not-learned state may be determined based on the states of the learning elements of each of the one or more unitary steps of the pedagogical task. FIG. 3D illustrates an aspect of mapping pedagogical tasks 253 of a set of tasks in database 252 to learning elements 364 which are used or exposed to a user or computer when interfaced with the tasks 253. This provides another exemplary means for estimating the learning elements in Block 204 from Block 202 in FIG. 2A. In FIG. 3D, a specific task 253 identified as task 1 is shown to be composed of 5 unitary steps 273 identified as unitary steps 1-5. For each of these unitary steps 1-5, learning elements 1-14 which are used are mapped (e.g., based on c-delta vectors 304 which correspond to the respective unitary steps 1-5). Of these learning elements for each unitary step, the learning elements which are in a learned state 354 and the learning elements which are in not-learned state 352 are identified. From the learning elements used for each unitary step, the overall learning elements 1-14 which are used for task 1 are consolidated and from this consolidated mapping of learning elements which are used for task 1, the learning elements in not-learned state 352 and the learning elements in learned state 354 are also identified. These mappings provide the basis for several analyses which can be performed about a user's abilities with respect to task 1, for example, based on learning elements 364 (or more generally, in estimating Block 206 from Block 204 of FIG. 2A).

For example, based on the indication of learning elements 1, 3, 8, and 9 in not-learned state 352 in the illustrated example, task 1 may be determined as not having been learned by the user. In further detailed analyses, 50% of all the learning elements which are mapped to task 1 may be identified as learned and 50% as not-learned. Furthermore, by delving into the state of learning elements mapped to component unitary steps 1-5, 40% of the unitary steps 1-5 (i.e., unitary steps 2 and 5) are seen to have all their learning elements in learned state 354 leading to a determination that 40% of the unitary steps of task 1 have been learned by the user while 60% of the unitary steps are not yet learned.

FIG. 3E illustrates yet another aspect of mapping tasks 253, of which 10 tasks 1-10 have been shown, to their learning states 365. For example, learning state 365 of task 1 may be obtained as shown in FIG. 3D, wherein task 1 is in a learned state if all of the learning elements which map to task 1 are learned (which in the above-described example of FIG. 3D was not the case, leading to the determination that task 1 is not learned). Similarly, learning states 365 of all tasks 1-10 can be identified. Furthermore, from analyses such as described in FIG. 3D, the learning elements which are not learned, termed as missing learning elements 364' which are in not-learned state 352 for each one of tasks 1-10 can also be identified.

From the above analyses comprising determination of the states 352/354, transition probability 366, half-life 368 of learning elements (e.g., FIG. 3C), determination of mappings of learning elements used to tasks 253 of a task database 252 (e.g., FIG. 3D), and determinations of learning states 365 of individual tasks 253 and missing learning elements 364' pertaining to tasks 253 (e.g., FIG. 3E), various means for estimating and improving a user's abilities for learning tasks of task class T will now be described.

The proficiency of the user for a pedagogical task may be determined based on the learning elements in the not-learned state for all pedagogical tasks of the pedagogical exercise. In one example, an overall proficiency may be obtained (e.g., a score of $3/10$ tasks learned or 30% may be derived from learning states 365 of tasks 253 in FIG. 3E). This provides a quantitative and useful indication of the user's ability (or inability) in performing a set of tasks in the task class being taught to the user by a computer-aided education system.

Further, the learning elements 364 which are learned and learning elements 364' which are missing (e.g., for each task 253, as well as for each unitary step 273) may be used to track individual learning elements (or more generally, learnable elements), and obtain an overall score for the user's faculty for task class "T", and thus, aspects include means for accurately determining what exactly is learned, tested or taught at the level of granularity of each component unitary step 273.

In another aspect, an ability of the user with respect to a first set of pedagogical tasks may be determined based on the ability of the user with respect to a second set of pedagogical tasks, wherein the first set of pedagogical tasks and second set of pedagogical tasks have one or more common learning elements, and wherein the ability of the user with respect to the second set of pedagogical tasks is based on the states of the learning elements of the second set of pedagogical tasks. For instance, it is possible to predict, given a learner's past test performance for some tasks (e.g., tasks t1 to tn), whether the learner would be capable of successfully performing another task (e.g., tn+1). For this, each task t1 to tn as well as the task tn+1 may be decomposed into component sets of unitary steps 273, for which corresponding learning elements may be determined as shown in FIG. 3E. A learning model may be constructed that captures an estimate of how well the learner has learned the faculty represented by a particular set of learning elements which map to each task (e.g., based on the number of missing learning elements 364' for each task). A prediction of whether the learner can do task tn+1 may be made by calculating a probability based on the individual probabilities of each learning element that comprises the task tn+1, e.g., based on knowing which learning elements 364' for task tn+1 are missing from the above analysis of the learning elements 364' missing for tasks t1-tn.

In yet another aspect, an aggregate or consolidated list of all the missing learning elements 364' for all tasks 253 may be used to provide an indication of the learner's abilities or acquisition of the faculty for the task class T.

In another aspect, a "maximally useful skill" (e.g., with respect to a class task T) or a maximally useful learning element for a pedagogical exercise may be determined for the user at any point of time. The maximally useful learning element for the pedagogical exercise may be understood as a learning element whose transition from a not-learned state to a learned state effects learning of the most number of pedagogical tasks of the pedagogical exercise. For instance, from FIG. 3E, learning element 8 of the set of missing learning elements 364' is seen to be mapped to the most number of tasks which are not learned. From this, a determination may be made that learning element 8 may be the most useful learning element for the user to learn in order to improve the user's overall abilities for the set of tasks 1-10. Quantitatively, converting element 8 to learned state 354 can increase the user's proficiency from the current $3/10$ tasks learned to $5/10$ tasks learned (since tasks 3 and 9 are seen to be missing only learning element 8). This is an improvement of proficiency from $3/10$ or 30% to $5/10$ or 50% in terms of the user's score with respect to the learning of tasks 1-10.

In the above manner, maximally useful skills or learning elements which generate the highest growth at any point in a user's learning curve may be determined and used in designing a curriculum for the user, which is designed to maximize the user's learning. A curriculum for the user's education may be created, for example, using a sequence of learning elements which will generate the highest growth in a learning curve of the user at any point in the user's education. For instance, from FIG. 3E, following a similar analysis of proficiency improvements at any point in the user's learning curve, the sequence of learning the learning elements in the order of 8, 9, 3, 1, 4, 5 is seen to provide the most efficient learning curve, which takes the user's learning proficiency, respectively, in the order of 50%, 70%, 70%, 80%, 90%, 100%.

In a similar aspect, considering a task database 252 containing tasks t1 to tN, if the user is able to perform a certain number, say "p" tasks in the above manner, but for another number, say "q" tasks, the user falls short of being having learned or being able to do the tasks by a single learning element say "delta", then by grouping such delta learning elements, it is possible to evaluate which of the delta learning elements may have the property that by learning it, the learner has the highest capability gain. The computer-aided education system can then choose tasks that exercise this specific delta learning element vector as the focus of the next lesson, for example.

Furthermore, gaps in the curricula may also be determined effectively be determining whether any learning elements are not covered. In the above example, learning element 10 is not part of the learning elements taught and so the curriculum for teaching tasks 1-10 is seen to be missing learning element 10. Corresponding corrective measures may be taken to teach learning element 10 to the user.

As noted above, the efficacy of a particular pedagogical curriculum (e.g., database 252) may be measured by decomposing the pedagogical curriculum into individual pedagogical tasks and aggregating the learning elements to provide an overall coverage of the pedagogical curriculum. In further aspects, the coverage or score for one pedagogical curriculum may be compared with similar coverage of another pedagogical curriculum, to enable selection of an optimal curriculum.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an aspect of the invention can include non-transitory computer-readable media embodying a method for quantitative education (e.g., code, which, when executed by a computer-aided education system, causes the computer-aided education system to perform operations for quantitative education). Accordingly, the invention is not limited to illustrated examples and any means for performing the functionality described herein are included in aspects of the invention.

While the foregoing disclosure shows illustrative aspects of the invention, it should be noted that various changes and modifications could be made herein without departing from the scope of the invention as defined by the appended claims. The functions, steps and/or actions of the method claims in accordance with the aspects of the invention described herein need not be performed in any particular order. Furthermore, although elements of the invention may be described or claimed in the singular, the plural is contemplated unless limitation to the singular is explicitly stated.

What is claimed is:

1. A method of quantitative education, the method comprising:
    providing at least a part of a pedagogical exercise to a user to obtain a user response to the at least the part of the pedagogical exercise from the user performing at least one task associated with the pedagogical exercise;
    providing at least the part of the pedagogical exercise to a computer program for execution by performing the at least one task associated with the pedagogical exercise;
    mapping lines of the computer program that are triggered in the execution of the at least one task of the pedagogical exercise to a vector;
    determining a coverage bitmap for the at least the one or more task of the pedagogical exercise by mapping the lines of the computer program that are triggered in the execution of the at least one task of the pedagogical exercise by the computer program to one or more bits of the vector; and
    determining one or more learning elements corresponding to each of the at least one task of the pedagogical exercise from the coverage bitmap; and
    analyzing abilities of the user with respect to the one or more determined learning elements based on the user response for each of the at least one task; and
    based on the analysis, output an indication of the user's ability for each of the at least one task of the pedagogical exercise.

2. The method of claim 1, comprising generating the at least the part of pedagogical exercise by decomposing a pedagogical task of the pedagogical exercise into one or more unitary steps.

3. The method of claim 2, further comprising:
    determining one or more delta bitmaps corresponding to the one or more unitary steps, wherein a delta bitmap for a unitary step comprises a mapping of the lines of the computer program that are triggered in the execution of the unitary step by the computer program to one or more bits of a vector; and
    determining the one or more learning elements corresponding to the at least the part of the pedagogical exercise from the one or more delta bitmaps.

4. The method of claim 3, further comprising performing a dimensionality reduction on one or more sets of delta bitmaps corresponding to one or more learning elements, to generate a set of one or more c-delta vectors, wherein the one or more c-delta vectors are orthogonal and represent the one or more learning elements, such that each of the one or more delta bitmaps is expressed as a combination of learning elements represented by the one or more c-delta vectors.

5. The method of claim 4, wherein analyzing the user's abilities with respect to the one or more learning elements based on the user response comprises mapping the one or more unitary steps to the one or more learning elements.

6. The method of claim 5, further comprising, for each unitary step, determining whether the one or more learning elements mapped to the unitary step are in a learned state or a not-learned state.

7. The method of claim 6, further comprising determining, for each learning element, the probability associated with transitioning between the learned state and the not-learned state, or vice-versa.

8. The method of claim 6, further comprising determining, for a learning element in a learned state, a half-life of retention in the learned state or a time to transition to the not-learned state.

9. The method of claim 6, further comprising determining, for each pedagogical task, the corresponding learning elements in the learned state and the learning elements in the not-learned state based on the states of the learning elements of each of the one or more unitary steps of the pedagogical task.

10. The method of claim 9, further comprising, determining a proficiency of the user for the pedagogical task, based on the learning elements in the not-learned state for all pedagogical tasks of the pedagogical exercise.

11. The method of claim 9 further comprising determining an ability of the user with respect to a first set of pedagogical tasks based on the ability of the user with respect to a second set of pedagogical tasks, wherein the first set of pedagogical tasks and second set of pedagogical tasks have one or more common learning elements, and wherein the ability of the user with respect to the second set of pedagogical tasks is based on the states of the learning elements of the second set of pedagogical tasks.

12. The method of claim 9, further comprising, determining a maximally useful learning element for the pedagogical exercise as a learning element whose transition from a not-learned state to a learned state effects learning of the most number of pedagogical tasks of the pedagogical exercise.

13. The method of claim 12, further comprising:
designing a curriculum for the user's education by creating a sequence of learning elements which will generate the highest growth in a learning curve of the user at any point in the user's education.

14. An apparatus comprising:
means for providing at least a part of a pedagogical exercise to a user to obtain a user response to the at least the part of the pedagogical exercise from the user performing at least one task associated with the pedagogical exercise;
means for providing at least the part of the pedagogical exercise to a computer program for execution by performing the at least one task associated with the pedagogical exercise;
means for mapping lines of the computer program that are triggered in the execution of the at least one task of the pedagogical exercise to a vector;
means for determining a coverage bitmap for the at least the one or more task of the pedagogical exercise by mapping the lines of the computer program that are triggered in the execution of the at least one task of the pedagogical exercise to one or more bits of the vector; and
means for determining one or more learning elements corresponding to each of the at least one task of the pedagogical exercise from the coverage bitmap; and
means for analyzing abilities of the user with respect to the one or more determined learning elements based on the user response for each of the at least one task; and
means for outputting, based on the analysis, an indication of the user's ability for each of the at least one task of the pedagogical exercise.

15. The apparatus of claim 1, comprising:
means for decomposing a pedagogical task of the pedagogical exercise into one or more unitary steps;
means for determining one or more delta bitmaps corresponding to the one or more unitary steps, wherein a delta bitmap for a unitary step comprises a mapping of the lines of the computer program that are triggered in the execution of the unitary step by the computer program to one or more bits of a corresponding vector; and
means for determining the one or more learning elements corresponding to the at least the part of the pedagogical exercise from the one or more delta bitmaps.

16. The apparatus of claim 15, further comprising
means for analyzing the user's abilities with respect to the one or more learning elements based on whether the one or more learning elements are in a learned state or a not-learned state; and
means for determining, for the one or more learning elements, probabilities associated with transitioning between the learned state and the not-learned state, or vice-versa.

17. The apparatus of claim 16, further comprising
means for determining, from at least the probabilities, one or more of a proficiency of the user with respect to the pedagogical task, abilities of the user with respect to a set of pedagogical tasks, a maximally useful learning element for the pedagogical exercise, or a curriculum for the user's education.

* * * * *